W. T. Willits,
Grain Drill.
No. 21,715.    Patented Oct. 5, 1858.
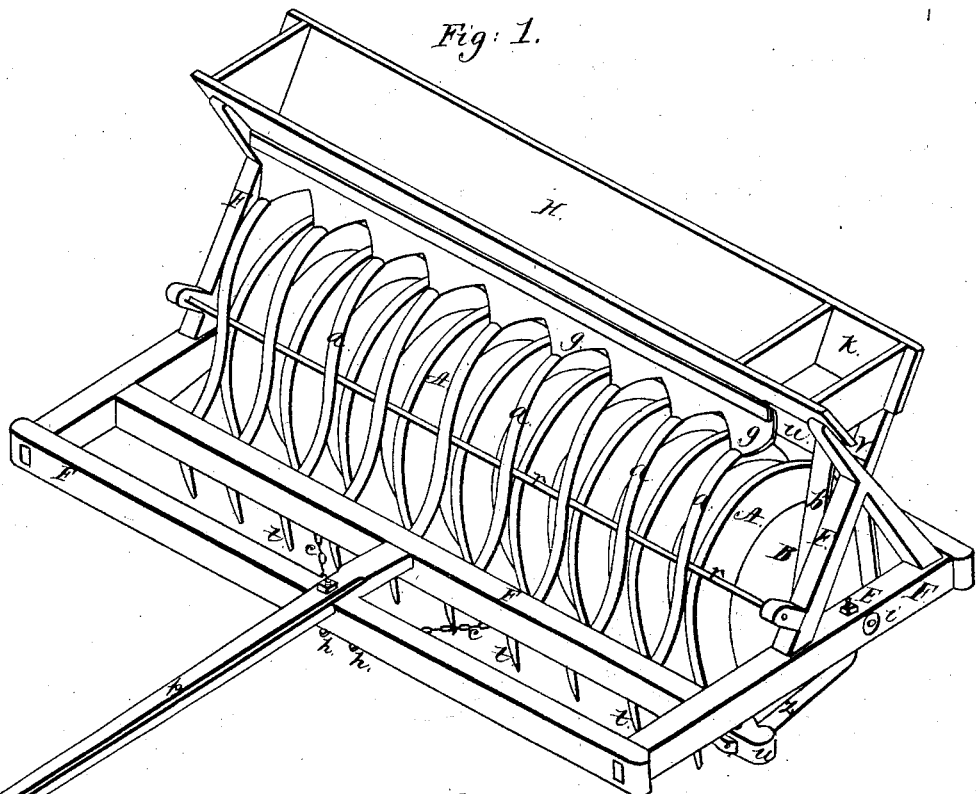
Fig: 1.
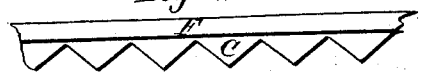
Fig: 4.
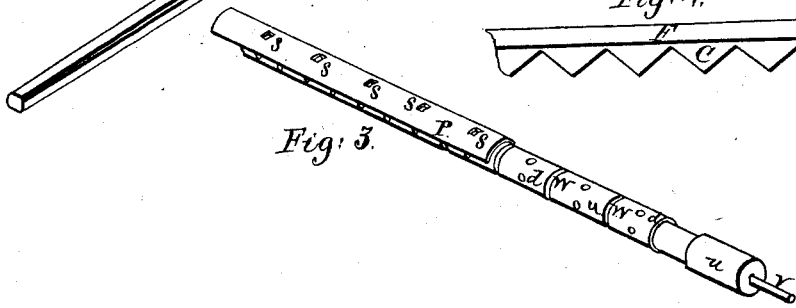
Fig: 3.
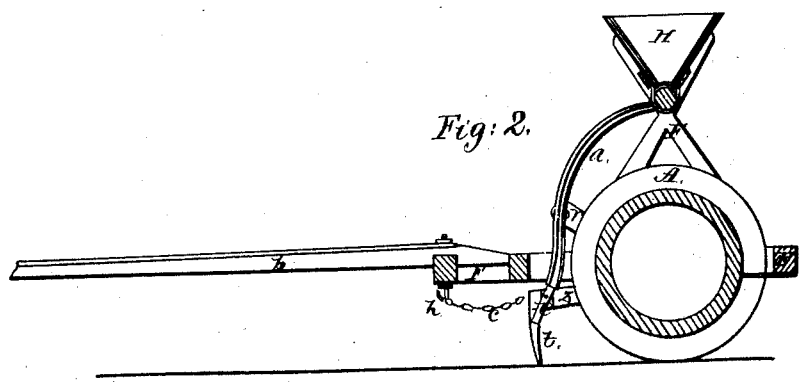
Fig: 2.

UNITED STATES PATENT OFFICE.

W. IRVIN WILLITS, OF MILTON, INDIANA.

IMPROVEMENT IN SEED-DRILLS.

Specification forming part of Letters Patent No. 21,715, dated October 5, 1858.

*To all whom it may concern:*

Be it known that I, W. IRVIN WILLITS, of Milton, in the county of Wayne and State of Indiana, have invented a new and useful Improvement in Seed-Drills; and I do hereby declare that the following is a full and exact description thereof, reference being had to the accompanying drawings and the letters of reference marked thereon and made to form a part of this specification.

Similar letters refer to like parts of the improvement.

The nature of my invention consists in the combination and arrangement of receding drill-plows and corrugated rollers, making the frame to which the receding drill-plows are attached adjustable, so that the grain may be buried at any required depth in the ground by arranging the drill-plows to work parallel either with the ridges or depressions of the corrugated roller.

To enable others skilled in the art to make and use my invention, I will proceed to describe its construction and operation, reference being had direct to the accompanying drawings, of which—

Figure 1 is an isometrical view of the improved seed-drill. Fig. 2 is a vertical sectional elevation of the same. Fig. 3 is an isometrical view of the seeding-cylinder, together with section of concave plate. Fig. 4 is a plan of the scraper for keeping the roller clean.

A, Fig. 1, represents the corrugated wooden roller, made hollow, and provided with end pieces, B, made of cast-iron. The roller A is attached to the frame F by means of arbors passing through the frame F at $i$.

The hopper H is made very similar to hoppers in seed-drills in common use. The compartment $k$ in the hopper H is made to carry tools in. The bottom of the hopper H is provided with the concave supply-plate P. (Shown in Fig. 3.) The plate P is made with the openings or slots $s$, to allow the seed to pass down into the pockets $g$, and thence through the conducting-tubes $a$ and drill-plows $t$ to the ground. The pockets $g$ are made of cloth, leather, or india-rubber, stitched together in the form shown, the edges being nailed to the sides of the hopper H. The conducting-tubes $a$ are made of india-rubber or other elastic substance.

$r$ represents an iron rod, made to support the conducting-tubes $a$ and prevent them from coming in contact with the roller A.

F represents the wooden frame-work of the drill.

Z represents the adjustable frame-work, to which the receding drill-plows $t$ are permanently attached. The frame Z is attached to the frame F by means of a staple-hinge at E, and is made with a loose tenon-joint at $o$, so as to allow lateral motion to the frame Z when it is required to change the position of the drill-plows $t$.

$c$ $c$ represent the chains which support the adjustable frame Z and prevent the drill-plows $t$ from running too deep in the ground.

$h$ $h$ represent hooks attached to the frame F to receive the chains $c$ $c$, and when it is desired to change the position of the drill-plows the chains are moved from one hook $h$ $h$ to the other.

$b$ represents a belt passing around a pulley attached to the end of the roller B and over the seeding-cylinder $u$, so that when the roller A is made to revolve by forward motion of the drill the seeding-cylinder $u$ is also made to revolve and the seed made to pass to the ground.

$u$ in Fig. 3 represents the seeding-cylinder, provided with grooves W and recesses $d$. The grooves W are made for small grains and the recesses $d$ for corn, so that by slipping the plate P until the openings $s$ are directly over the grooves W the small grain or seed is carried continuously to the drill-plows; or, if the openings $s$ are over the recesses $d$, corn will be deposited upon the ground in the required places for hills.

V represents the arbor of the cylinder $u$, and is made to fit in the frame F.

C in Fig. 4 represents a scraper attached to that part of the frame F which is behind the roller A, and is made to keep the roller A clean from earth, straw, &c.

P in Fig. 1 represents the pole to which horses are attached.

I claim nothing for the mode of feeding, as I am aware that similar devices are in common use.

What I claim as my invention, and desire to secure by Letters Patent, is—

The arrangement and combination of the corrugated roller A, the adjustable frame Z, the receding drill-plows $t$, the supporting-chains $c\ c$, and the hooks $h\ h$, all arranged and operating substantially as herein described, for the purposes set forth.

W. IRVIN WILLITS.

Witnesses:
H. E. CLIFTON,
GEO. W. L. BICKLEY.